United States Patent [19]

Janicki

[11] Patent Number: 5,472,500
[45] Date of Patent: Dec. 5, 1995

[54] HIGH STRENGTH, ABRASION RESISTANT VENEER PLASTER

[75] Inventor: Edmund J. Janicki, North Tonawanda, N.Y.

[73] Assignee: National Gypsum Company, Charlotte, N.C.

[21] Appl. No.: 234,867

[22] Filed: Apr. 28, 1994

[51] Int. Cl.$^6$ ................................................. C04B 11/00
[52] U.S. Cl. ........................ 106/778; 106/772; 106/784; 106/785; 106/788
[58] Field of Search ................................ 106/772, 778, 106/784, 785, 788, 735, 732

[56] References Cited

U.S. PATENT DOCUMENTS

| | | | |
|---|---|---|---|
| 3,582,376 | 6/1971 | Ames | 106/732 |
| 3,661,829 | 5/1972 | Aignesberger et al. | 106/732 |
| 3,852,081 | 12/1974 | Lehman | 106/732 |
| 3,972,723 | 8/1976 | Ballé et al. | 106/778 |
| 4,075,374 | 2/1978 | Jorgenson | 106/735 |
| 4,159,912 | 7/1979 | Jorgenson | 106/788 |
| 5,171,366 | 12/1992 | Richards et al. | 106/772 |

OTHER PUBLICATIONS

Three–Page Product Brochure of U.S. Gypsum Co.—Titled Imperial Plastics—Undated.
Product Bulletin of SKW Chemicals—Titled Melment—Undated.
Product Bulletin of Grain Processing Corp.—Titled: Water Lock A–100 Series—Undated.
Product Bulletin of GAF Chemicals Corp.—Titled Gantrez S–97 BF—Feb. 11, 1991.

*Primary Examiner*—Mark L. Bell
*Assistant Examiner*—Michael Marcheschi
*Attorney, Agent, or Firm*—Marshall, O'Toole, Gerstein, Murray & Borun

[57] ABSTRACT

A veneer plaster having strengths of substantially greater than 3,000 psi, abrasion resistance of penetrations less than 0.04 inch with 1,000 cycles of a five-pound brush using a 3M Granule Embedding Testing Machine, made from about 1,800 pounds of calcium sulfate beta hemihydrate, 200 pounds of fine silica sand, and about 4 pounds of a fine, white powder dispersant typified by a melamine-formaldehyde-sodium bisulfite polymer.

20 Claims, No Drawings

HIGH STRENGTH, ABRASION RESISTANT VENEER PLASTER

This invention relates to a novel, improved veneer plaster having improved strength and abrasion resistance and more particularly to a plaster formulation incorporating novel dispersants and fine aggregates to reduce mixing water demand.

BACKGROUND OF THE INVENTION

Veneer plasters are commonly employed to form wall surfaces, involving the application of a plaster coat, about 1/16-inch thick, over suitable plaster receptive boards, previously applied to a wall framework. These veneer plasters commonly have a compressive strength of about 1,200–1,400 psi, when tested according to ASTM-C472-90a, and have a penetration of over 0.05 inch after 200 cycles of brushing with a 3M Granule Embedding Testing Machine with a 5-pound loaded wire brush. They normally require about 65 grams of water per 100 grams of dry plaster formulation.

A veneer plaster, of unknown composition, has been sold having a compressive strength of about 3,000 psi. Accordingly, a formulation is desired for producing a veneer plaster having in excess of 3,000 psi compressive strength, substantially improved abrasion resistance and also a suitably and consistent white color.

SUMMARY OF THE INVENTION

The present invention involves a novel plaster formulation which preferably includes about 1,800 pounds of calcium sulfate beta hemihydrate, 200 pounds of fine silica sand, 2.7 pounds of set stabilizer, 1 pound of set retarder, 3.6 pounds of melamine-formaldehyde-sodium bisulfite polymer dispersant, 0.9 pound of superabsorbent polymer water retention aid and 0.7 pound of poly (methyl vinyl ether/maleic acid) trowel working aid. The invention further involves thoroughly mixing this preferred plaster formulation with water at a ratio of about 42 grams of water to 100 grams of the plaster formulation, and applying this aqueous mixture to a suitable plaster base to form a veneer plaster coat about 1/16- to 3/32-inch thick.

It is an object of this invention to provide a novel improved veneer plaster.

It is a further object to provide a novel veneer plaster having a compressive strength of substantially greater than 3,000 psi.

It is a still further object to provide a high strength veneer plaster having improved abrasion resistance.

It is a still further object to provide a high strength, abrasion resistant veneer plaster with good troweling characteristics which results in a true white plastered wall.

These and other objects and advantages of the invention will be more readily apparent when considered in relation to the preferred embodiments as set forth in the following specification.

DESCRIPTION OF THE PREFERRED EMBODIMENTS

The veneer plaster, according to the present invention, includes calcium sulfate beta hemihydrate, fine silica sand and a melamine-formaldehyde-sodium bisulfite polymer dispersant, additives as necessary for controlling setting times, a minor amount of a water retention aid and a minor amount of a trowel working aid.

EXAMPLE I

According to the present invention, a wall or ceiling veneer plaster dry formulation is prepared as follows:

| Material | Pounds |
| --- | --- |
| Calcium Sulfate Beta Hemihydrate | 1,800. |
| Fine Silica Sand | 200. |
| Melamine-Formaldehyde-Sodium Bisulfite Polymer Dispersant | 3.6 |
| Set Stabilizer | 2.7 |
| Set Retarder | 1.0 |
| Water Retentive Aid | 0.9 |
| Trowel Working Aid | 0.7 |
| Total | 2,008.9 |

To the above thoroughly blended dry formulation, there is added about 800 to 850 pounds of water, and the resultant aqueous slurry is uniformly blended prior to trowel application of the slurry over a suitable absorptive base for receiving plaster, such as a base wall of National Gypsum Company's Kal Kore board.

The calcium sulfate beta hemihydrate, which provides the cementitious binder, is a thorough blend of about half having an average particle diameter of about 5 microns, the other half about 35 microns, either or both being the product of calcination by a batch or continuous kettle process or a continuous calcination as in a heated hollow wall container with heated hollow screw conveyors or in a flash calciner.

The silica sand has a fineness, as measured by a U.S. Standard Sieve Series, as follows:

| | |
| --- | --- |
| % Retained on 50 | 0–0.4 |
| % Retained on 70 | 0.2–8 |
| % Retained on 100 | 8–47 |
| % Retained on 140 | 23–42 |
| % Retained on 200 | 15–32 |
| % Retained on 270 | 4–13 |
| % Retained on 325 | 2–5. |

The silica sand provides the very abrasion resistant characteristic of the plastered wall, with the very fine sand particles performing like a surface of hard, smooth, ball bearing balls, and the fineness contributing to the high density and strength of the plastered wall. A preferred source of fine silica sand is Wedron Silica Co. number 0710 silica sand.

A novel vital element of the formulation is the melamine-formaldehyde-sodium bisulfite polymer dispersant, which is available as Melment F15G, a product of SKW Chemicals, Inc. This dispersant is a fine white powder, with a maximum of 10% by weight not passing through a #70 sieve, a purity of at least 96 %, a bulk density of 40±6 lbs./ft.$^3$, a pH in a 20% aqueous solution of 8.5±1.5, a percentage sodium content of 10±1.0, a maximum chloride content of 0.05%, a free formaldehyde maximum content of 0.10%, with good solubility in water, and a molecular weight of 5,000 to 20,000. This dispersant has the critical characteristic of having little if any discoloring tendencies in the desired white colored veneer plaster of the invention.

The set control agents are used to stabilize the setting action against external job-induced influences and to control setting action for proper job performance, in a manner well understood in the art.

The water retentive aid is preferably a superabsorbent polymer, such as Grain Processing Corporation's Waterlock Polymer A-180, classed as starch-graft-poly (sodium acrylate-co-acrylamide) superabsorbent powders, as disclosed in U.S. Pat. No. 3,661,815. This additive controls the release of water from the plaster into the baseboard or the atmosphere.

The trowel working aid is preferably a poly (methyl vinyl ether/maleic acid) such as GAF Chemicals Corporation's Gantrez S-97BF. It provides the necessary lubricity under the trowel to provide good application and finishing properties to the plaster.

The mixed mortar density is about 110 to 115 lbs./ft.$^3$ and the dry set density is about 92–95 lbs./ft.$^3$. The setting time is preferably 60–80 minutes by cement Vicar.

Examples of set stabilizers are NGC Stabilizer produced by National Gypsum Company, calcium sulfate dihydrate, aluminum sulfate, potassium sulfate, and portland cement. Examples of set retarders are NGC High Strength Retarder produced by National Gypsum Company, tartaric acid, citric acid, sodium citrate, acrylic resins, etc.

PREFERRED RANGES

Variations in the amounts of the several ingredients of the preferred formulation of Example I have been found to be about as follows:

| Material | Pounds |
| --- | --- |
| Calcium Sulfate Beta Hemihydrate | 1,700–1,925 |
| Fine Silica Sand | 75–300 |
| Melamine-Formaldehyde-Sodium Bisulfite Polymer Dispersant | 1.0–6 |
| Set Stabilizer | 1.5–5 |
| Set Retarder | 0.2–2 |
| Water Retentive Aid | 0.25–2 |
| Trowel Working Aid | 0.2–1.5 |
| Water to Form Optimum Plaster Slurry | 750–900 |

The addition of lime may be necessary to provide the alkaline properties required by some forms of set retarder.

Compressive strength tests were made of blocks formed from the following formulations comparing a block A without the trowel working aid with block B including the trowel working aid, and also of formulations comparing a block C with a standard set retarder with block D having tartaric acid retarder and including some hydrated lime, as follows:

| | A | B | C | D |
| --- | --- | --- | --- | --- |
| Hydrated Lime | — | — | — | 7 |
| Calcium Sulfate Beta Hemihydrate | 1,800 | 1,800 | 1,800 | 1,793 |
| Fine Silica Sand | 200 | 200 | 200 | 200 |
| Melment F15G | 3.6 | 3.6 | 3.6 | 3.6 |
| Set Stabilizer | 2.7 | 2.7 | 2.7 | 2.7 |
| FTD Set Retarder | 1.17 | 1.17 | 1.3 | — |
| Tartaric Acid Set Retarder | — | — | — | 0.6 |
| Water Retentive Aid | 0.9 | 0.9 | 0.9 | 0.9 |
| Trowel Working Aid | — | 0.54 | 0.5 | 0.5 |
| Water | 800 | 800 | 800 | 782 |
| Compressive Strength psi | 3,680 | 3,408 | 3,787 | 3,469 |

Abrasion resistance was evaluated on samples of each formulation, using a 3M Granule Embedding Testing Machine. A weighted wire brush, five pounds, scrubs the surface of a small sample. In all tests, penetration by the brush after 1,000 cycles was less than 0.04 inch, averaging less than 0.02-inch scratch depth.

Having completed a detailed description of the preferred embodiments of my invention so that those skilled in the art may practice the same, I contemplate that variations may be made without departing from the essence of the invention.

I claim:

1. A veneer plaster composition comprising, in parts by weight based on about 1,778 to about 2,251 parts by weight of the dry composition: from about 1,700 to about 1,925 parts by weight of calcium sulfate beta hemihydrate, from about 75 to about 300 parts by weight of silica sand, from about 1 to about 6 parts by weight of a melamine-formaldehyde-sodium bisulfite polymer dispersant, and from about 2 to about 20 parts by weight of additives for improved set and trowelability.

2. A veneer plastic composition as defined in claim 1, wherein said silica sand has a fineness of:

| | |
| --- | --- |
| % Retained on #50 U.S. Standard Sieve | 0–0.4 |
| % Retained on #70 U.S. Standard Sieve | 0.2–8 |
| % Retained on #100 U.S. Standard Sieve | 8–47 |
| % Retained on #140 U.S. Standard Sieve | 23–42 |
| % Retained on #200 U.S. Standard Sieve | 15–32 |
| % Retained on #270 U.S. Standard Sieve | 4–13 |
| % Retained on #325 U.S. Standard Sieve | 2–5. |

3. A veneer plaster composition as defined in claim 1, wherein said melamine-formaldehyde-sodium bisulfite polymer dispersant is water-soluble, and has a molecular weight of about 5,000 to about 20,000, and wherein said composition provides a white color upon setting.

4. A veneer plaster composition as defined in claim 3, wherein said additives include from about 1.5 to about 5 parts by weight of set stabilizer, from about 0.2 to about 2 parts by weight of set retarder, from about 0.25 to about 2 parts by weight of water retentive aid and from about 0.2 to about 1.5 parts by weight of trowel working aid.

5. A veneer plaster composition as defined in claim 1, wherein said calcium sulfate beta hemihydrate is a blend of about half having an average particle diameter of about 5 microns and half having an average particle diameter of about 35 microns.

6. A veneer plaster composition as defined in claim 1, wherein said melamine-formaldehyde-sodium bisulfite polymer dispersant has a maximum of about 10% retained on a #70 sieve, a purity of at least about 96%, a bulk density of about 40 pounds/ft$^3$, is water-soluble, and has a molecular weight in the range of about 5,000 to about 20,000.

7. A veneer plaster composition as defined in claim 1 further comprising from about 750 to about 900 parts by weight of water to form a trowelable composition.

8. A veneer plaster composition as defined in claim 7 having a density of about 110 to 115 lbs./ft.$^3$.

9. A veneer plaster composition as defined in claim 7 having a setting time by cement Vicat of about 60 to about 80 minutes.

10. A veneer plaster composition as defined in claim 4, wherein said water retentive aid is present in an amount of about 0.25 to about 2 parts by weight and comprises a superabsorbent acrylate polymer, and wherein the trowel working aid comprises a methyl vinyl ether/maleic acid polymer in an amount of about 0.2 to about 1.5 parts by weight.

11. A veneer plaster composition as defined in claim 4, wherein said silica sand has a fineness of:

| | |
|---|---|
| % Retained on #50 U.S. Standard Sieve | 0–0.4 |
| % Retained on #70 U.S. Standard Sieve | 0.2–8 |
| % Retained on #100 U.S. Standard Sieve | 8–47 |
| % Retained on #140 U.S. Standard Sieve | 23–42 |
| % Retained on #200 U.S. Standard Sieve | 15–32 |
| % Retained on #270 U.S. Standard Sieve | 4–13 |
| % Retained on #325 U.S. Standard Sieve | 2–5. |

12. A veneer plaster composition as defined in claim 10, wherein said application aid additives include from about 1.5 to about 5 parts by weight of set stabilizer selected from the group consisting of tartaric acid, citric acid, sodium citrate, an acrylic resin, and mixtures thereof.

13. A set veneer plaster composition resulting from the setting reaction of the ingredients of claim 7.

14. A set veneer plaster composition as defined in claim 13, said set veneer plaster composition having been dried and being substantially devoid of free water.

15. A set veneer plaster composition as defined in claim 14, said plaster composition having a compressive strength greater than 3,000 psi.

16. A set veneer plaster composition as defined in claim 14, said plaster composition having an abrasion resistance such that, after 1,000 cycles of abrasion by a five-pound weighted brush, using a 3M Granule Embedding Testing Machine, penetration is less than 0.04 inch.

17. A set veneer plaster composition resulting from the setting reaction of the ingredients of claim 12.

18. A set veneer plaster composition as defined in claim 17, said set veneer plaster composition having been dried and being substantially devoid of free water.

19. A set veneer plaster composition as defined in claim 17, said plaster composition having a compressive strength greater than 3,000 psi.

20. A set veneer plaster composition as defined in claim 17, said plaster composition having an abrasion resistance such that, after 1,000 cycles of abrasion by a five-pound weighted brush, using a 3M Granule Embedding Testing Machine, penetration is less than 0.04 inch.

* * * * *